United States Patent [19]

Cook

[11] Patent Number: 4,850,384
[45] Date of Patent: Jul. 25, 1989

[54] ELECTRIC VACUUM REGULATOR

[75] Inventor: John E. Cook, Chatham, Canada

[73] Assignee: Siemens-Bendix Automotive Electronics Limited, Chatham, Canada

[21] Appl. No.: 250,467

[22] Filed: Sep. 28, 1988

[51] Int. Cl.⁴ ............................................. F16K 31/06
[52] U.S. Cl. ................................. 137/14; 137/625.65; 251/129.05; 251/129.08; 251/129.16
[58] Field of Search ...................... 137/14; 251/129.08, 251/129.05, 129.16

[56] References Cited

U.S. PATENT DOCUMENTS 4,005,733 2/1977 Riddel ........................ 251/129.16 X
4,610,428 9/1986 Fox ................................. 251/129.16

FOREIGN PATENT DOCUMENTS 0124399 11/1984 European Pat. Off. .

Primary Examiner—Arnold Rosenthal
Attorney, Agent, or Firm—Russel C. Wells; George L. Boller

[57] ABSTRACT

A pressure regulating valve comprising:
  a magnetic circuit comprising a magnetic central portion having a fluid passage, adapted to receive fluid at a first pressure level;
  an annular, upraised magnetic valve seat coaxial with the central portion and disposed at and about one end of the central portion, the one end and valve seat disposed within a pressure chamber, the magnetic circuit further including a movable valve element, acted upon by the magnetic flux flowing through the magnetic circuit, to regulate the pressure within the pressure chamber corresponding with an input electrical signal, including a disk comprising, in at least a portion thereof through which the magnetic flux flows, a non-magnetic material of a given thickness facing the valve seat and a magnetic material secured to the non-magnetic material on a dimension thereof opposite the valve seat;
  a spring for biasing the disk toward the valve seat;
  an output port for communicating the pressure chamber to a pressure responsive device;
  an input port for communicating fluid at a second pressure level to the pressure chamber.

3 Claims, 1 Drawing Sheet

ELECTRIC VACUUM REGULATOR

BACKGROUND AND SUMMARY OF THE INVENTION

The present invention relates generally to solenoid valves and more particularly to an electric vacuum regulator valve. Electric vacuum regulator valves as the name implies, operate on various input signals to generate a controlled output pressure signal. Quite often these vacuum regulators control the operation of other vacuum responsive devices such as vacuum motors. It is a known phenomenon that the generated controlled or output pressure of devices such as the present invention is a generally linear function of input current. Typical of the electric vacuum regulator art is U.S. Pat. No. 4,534,375 "Proportional Solenoid Valve" by Fox and European Patent Application EPA No. 84400623.9 "Electric Vacuum Regulator" by Mulder. The above references are illustrative of a relatively wide range of electropneumatic valves. In general, this class of electropneumatic valves operate in two distinct modes. The first, as illustrated by Fox and Mulder, is to establish a force equilibrium. More specifically, these valves are designed to generate an output pressure which varies between atmospheric pressure and a control pressure (which is typically a level established by a vacuum source such as engine intake manifold pressure). A movable valving element such as a flat plate is positioned within a pressure chamber and subject to a pressure force differential resulting from the interaction of atmospheric pressure forces and the controlled vacuum pressure forces. The disk is also located within and forms part of an electromagnetic circuit which upon activation establishes a electromagnetic-pressure force differential to control the output pressure signal as a function of an input variable, i.e. magnitude of current, duty cycle, et cetera. U.S. Pat. No. 4,005,733 "Pressure Control Valve" by Ridell, illustrates another electric vacuum regulating device which rather than establishing an equilibrium of electromagnetic and pressure forces across a movable valve, controls the output pressure by controlling the percent of time in each duty cycle that a particular valve seat (Ridell uses two) is opened in relation to the percent of time that it is closed.

Each of the above described devices must be calibrated such that the output or controlled pressure for a given input signal is a defined or definable quantity. With regard to Fox and Mulder, physical adjustment or calibration after assembly is required and performed in the following ways. Prior to adjustment a calibration point (or set point, operating point) has been determined such that for a given level of input current the output pressure should be a specified value. To obtain this value, in fact, requires that the air gap measured between a ferrous cylinder and a non-magnetic seat be varied to compensate for the stack-up of manufacturing tolerances to permit it the generation of a required magnetic force to be exerted on the valve element. In Fox this requires a relatively complicated calibration process in which his metal stator 16 is axially slid within a sleeve while his coil 18 is activated. Upon monitoring the output pressure the position of the metal tube 16 and sleeve 30 is fixed by welding, gluing or the like. In Mulder the air gap or orifice 30 is varied to similarly compensate for the stack-up of manufacturing tolerances. In contrast to the axial sliding used by Fox, Mulder uses a stator 36 which threadably engages a non-magnetic valve seat 50. Upon adjustment at the calibration or set point, the stator 36 with his coil 44 energized, is screwed in and out to vary the properties of the magnetic circuit in order to generate the desired controlled or output pressure.

As can be seen, the designs of Mulder and Fox require that in a production environment each and every vacuum regulator must be adjusted or calibrated. This procedure adds to the overall cost of the respective units.

It is an object of the present invention to provide an electric vacuum regulator that does not need post assembly calibration or adjustment. A further object of the present invention is to generate an output pressure signal proportional to an input current control signal.

Accordingly, the invention comprises: a pressure regulating valve comprising:

a magnetic circuit comprising a magnetic central portion having a fluid passage, adapted to receive fluid at a first pressure level; an annular, upraised magnetic valve seat coaxial with the central portion and disposed at and about one end of the central portion, the one end and valve seat disposed within a pressure chamber, the magnetic circuit further including first means, acted upon by the magnetic flux flowing through the magnetic circuit, to regulate the pressure within the pressure chamber corresponding with an input electrical signal, including a disk comprising, in at least a portion thereof through which the magnetic flux flows, a non-magnetic material of a given thickness facing the valve seat and a magnetic material secured to the non-magnetic material on a dimension thereof opposite the valve seat; means for biasing the disk toward the valve seat; means for communicating the pressure chamber to a pressure responsive device; first passage means for communicating fluid at a second pressure level to the pressure chamber.

Many other objects and purposes of the invention will be clear from the following detailed description of the drawings.

DETAILED DESCRIPTION OF THE DRAWINGS

Figure 1:
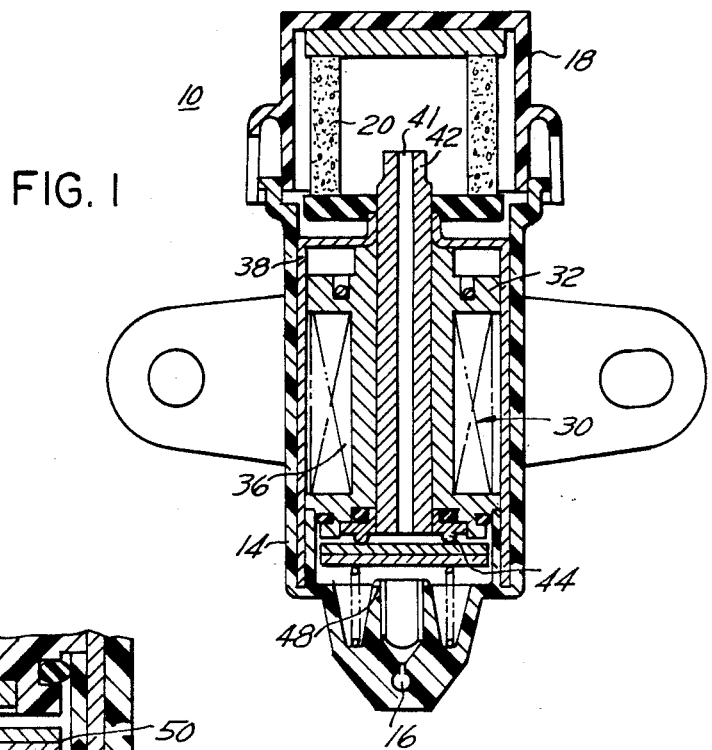
FIG. 1 illustrates a cross-sectional view of an exemplary solenoid valve utilizing the present invention.
Figure 3:
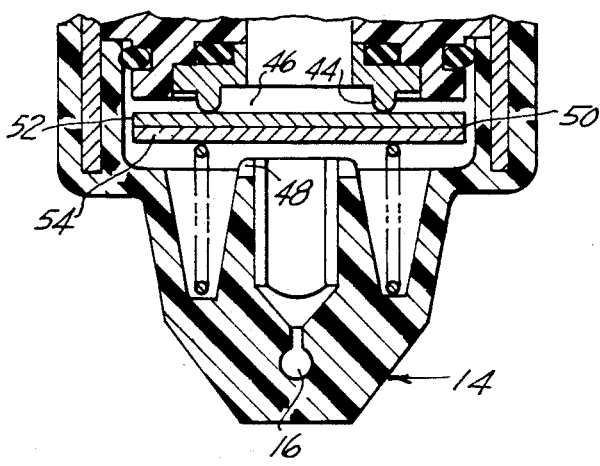
FIG. 3 illustrates an enlarged, partial sectional view of the valve illustrated in FIG. 1.
Figure 2:
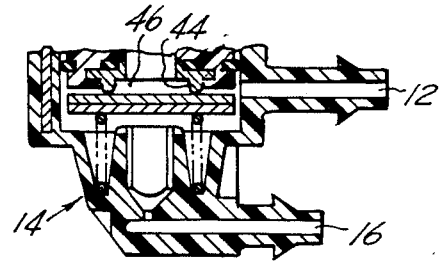
FIG. 2 illustrates a partial cross-sectional view of the valve illustrated in FIG. 1.

FIG. 1 illustrates a solenoid valve 10 modified in accordance with the present invention. More specifically, such valve 10 is an electromagnetic vacuum regulator which generates, at an output port 12, a controlled pressure (after connection to a vacuum motor or the like). The valve 10 comprises a housing 14, the lower part of which forms a vacuum input port 16. The housing further includes a top cap 18 secured thereon in a known manner. Positioned within the top cap is an air filter 20. The air filter illustrated is made from foam. Located within the housing 14 is a coil assembly generally shown as 30. The coil assembly comprises a non-magnetic bobbin 32 and an annular shaped coil 36 wound thereon. Extending from the air filter into a pressure chamber 40 formed by the housing and bobbin 32 is a metal stator or pipe 42. Formed as an integral part of the stator 42 is a magnetic valve seat generally shown as 44. Further, the stator 42 may be hollow defining a port 41 for communicating air into a chamber 46, but this is not a requirement of the present invention. Positioned within the chamber and formed as part of the housing is a lower mechanical stop 48, the valve seat 44 functioning as an upper stop. Also positioned within the chamber 40 is a flat disk armature 50. A spring 59 may optionally be included within the valve 10 to urge the disk 50 into closing relation upon the valve seat 44. In addition, the coil assembly 30 may include a ferromagnetic strap 38 which provides a low reluctance path for magnetic flux.

The armature 50 of the present invention is fabricated of a laminate construction comprising a non-magnetic disk 52 laminated or otherwise attached to a magnetically attractable disk 54. The non-magnetic disk 52 may be fabricated of a metal such as brass or a rubber material such as Viton. The magnetic portion 54 of the armature 50 may be fabricated of steel or the like. It is not a requirement of the invention that the non-magnetic portion 52 be formed as a disk. An annular, ring-like construction is within the scope of the invention. In either case, the non-magnetic portion should be located such that flux will flow threrethrough and be proximate to the valve seat 44.

As will be seen from the discussion below, the laminated disk or armature 50 provides for very accurate control of the electromagnetic forces without the need for post-assembly adjustment or calibration which is characteristic of the prior art. As mentioned above, valves of the type shown in the above references and the accompanying figures generate an output pressure generally proportional to an input current signal. This current signal can be a dc voltage or a pulse-width control signal. The key to the operation of any such sensor is to be able to generate a predetermined output pressure signal at a calibration or set point. This requires energizing the coil 36 with a predetermined current signal and measuring the output pressure generated at port 12. In the above referenced prior art, this procedure is known as calibration wherein the electromagnetic force acting upon a metal armature is varied to achieve an electromagnetic-pressure force equilibrium. It is noteworthy to mention again that each valve must be adjusted to insure the prescribed performance at the calibration or set point. It is relatively straight forward to see the cause of the stack-up of tolerances in that the non-magnetic valve seats employed in the prior art are fastened to intermediate elements in a manner that there is no way of insuring the required dimensional tolerance. In essence, the post assembly calibration procedure of the prior art varies an air gap distance thereby varying the overall reluctance of the magnetic circuit such that for a defined current input a defined electromagnetic force will be exerted on the metal (Prior art) armatures. In contrast, the present invention does not need to undergo such part by part, sensor by sensor calibration. In the present invention the electromagnetic force (for a given input signal at the calibration point) acting upon the magnetic portion 54 of the laminated armature 50 is defined by an air gap (not shown) which may naturally exist between the metal valve seat 44 and the non-magnetic laminate 52 of the armature 50 and the thickness of the non-magnetic laminate 52. Based upon an imperical formula or by a trial and error procedure, the required laminate thickness 52 for the given input at the calibration point can be calculated or derived, thereby essentially fixing the overall reluctance of the magnetic circuit, at the calibration point, to achieve for a given input current signal the required output pressure signal. As can be seen, in a mass production environment, the determination of the reluctance of the magnetic path has been reduced to merely fabricating an armature having a non-magnetic laminated portion 52 of sufficient thickness to achieve the control point operating characteristics. Once such thickness has been determined, the assembly of subsequently mass produced electric vacuum regulating valves will be identical not requiring a post assembly calibration. It is estimated that the tolerances for a laminated portion having an approximate thickness of 0.015 inches (0.381 mm) can typically be held within plus or minus 0.001 inches (0.0254 mm) which will guarantee sufficient uniformity of operation for virtually all combinations of vacuum signal and input current signal.

Many changes and modifications in the above described embodiment of the invention can, of course, be carried out without departing from the scope thereof. Accordingly, that scope is intended to be limited only by the scope of the appended claims.

I claim:

1. A pressure regulating valve comprising:
   a magnetic circuit comprising a magnetic central portion having a fluid passage, adapted to receive fluid at a first pressure level;
   an annular, upraised magnetic valve seat coaxial with the central portion and disposed at and about one end of the central portion, the one end and valve seat disposed within a pressure chamber, the magnetic circuit further including first means, acted upon by the magnetic flux flowing through the magnetic circuit, to regulate the pressure within the pressure chamber corresponding with an input electrical signal, including a disk comprising, in at least a portion thereof through which the magnetic flux flows, a non-magnetic material of a given thickness facing the valve seat and a magnetic material secured to the non-magnetic material on a dimension thereof opposite the valve seat;
   means for biasing the disk toward the valve seat;
   means for communicating the pressure chamber to a pressure responsive device;
   first passage means for communicating fluid at a second pressure level to the pressure chamber.
   wherein at one operating point defined by a desired pressure level in the chamber, when communicated to a pressure responsive device for a given value of the input electric signal, the thickness of the non-magnetic portion of the disk is chosen such that the reluctance of the magnetic circuit is such as to produce a magnetic force upon the disk to establish an equilibrium force condition thereacross to regulate the pressure chamber pressure to the desired pressure at the calibration point.

2. The valve as defined in claim 1 wherein the non-magnetic portion is disk shaped.

3. In a vacuum pressure regulating valve a method of generating a controlled pressure signal at a calibration or specified operating point defined by established pressure signals and a predetermined current signal,
   the valve comprising: a magnetic circuit comprising a magnetic central portion having a fluid passage, adapted to receive fluid at a first pressure level;

an annular, upraised magnetic valve seat coaxial with the central portion and disposed at one end of the central portion, and about the one end of the central portion, the one end and valve seat disposed within a pressure chamber, the magnetic circuit further including first means, acted upon by the magnetic flux flowing through the magnetic circuit, to regulate the pressure within the pressure chamber corresponding with an input electrical signal, including a disk comprising, in at least a portion thereof through which the magnetic flux flows, a non-magnetic material of a given thickness facing the valve seat and a magnetic material secured to the non-magnetic material on a dimension thereof opposite the valve seat;

means for biasing the disk toward the valve seat;

means for communicating the pressure chamber to a pressure responsive device;

first passage means for communicating fluid at a second pressure level to the pressure chamber the method comprising the steps of
selecting one disk from a family of disks having non-magnetic portions of varying thicknesses and assembling the valve;

applying a pressure to various input pressure, applying the predetermined current signal corresponding to the operating point to generate magnetic flux;

measuring the control pressure in the pressure chamber;

comparing the actual control pressure to the desired control pressure, at the operating point, if an out of specification condition exists repeat the step of selecting by selecting another disk having a different thickness of non-magnetic material.

* * * * *